(12) United States Patent
Adachi et al.

(10) Patent No.: US 9,875,401 B2
(45) Date of Patent: Jan. 23, 2018

(54) IMAGE PROCESSING APPARATUS, NON-TRANSITORY COMPUTER READABLE MEDIUM, AND IMAGE PROCESSING METHOD FOR CLASSIFYING DOCUMENT IMAGES INTO CATEGORIES

(71) Applicant: FUJI XEROX CO., LTD., Tokyo (JP)

(72) Inventors: Shintaro Adachi, Kanagawa (JP); Shigeru Okada, Kanagawa (JP); Katsuya Koyanagi, Kanagawa (JP); Kunihiko Kobayashi, Kanagawa (JP); Hiroyuki Kishimoto, Kanagawa (JP); Akane Yoshizaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 54 days.

(21) Appl. No.: 15/012,369

(22) Filed: Feb. 1, 2016

(65) Prior Publication Data

US 2017/0091545 A1 Mar. 30, 2017

(30) Foreign Application Priority Data

Sep. 28, 2015 (JP) .................................. 2015-189255

(51) Int. Cl.
*G06K 9/62* (2006.01)
*G06K 9/00* (2006.01)
*G06K 9/68* (2006.01)

(52) U.S. Cl.
CPC ..... *G06K 9/00456* (2013.01); *G06K 9/00442* (2013.01); *G06K 9/00463* (2013.01); *G06K 9/6878* (2013.01); *G06K 2209/01* (2013.01)

(58) Field of Classification Search
CPC ........... G06K 9/00469; G06K 9/00463; G06K 9/00456; G06K 2209/01; G06F 17/30705; G06F 17/30707
See application file for complete search history.

(56) References Cited

U.S. PATENT DOCUMENTS 9,069,768 B1 * 6/2015 Sampson .......... G06F 17/30705

FOREIGN PATENT DOCUMENTS

JP 2005-242430 A 9/2005

OTHER PUBLICATIONS

Bayer, Thomas et al. "Information Extraction From Paper Documents". Handbook of Character Recognition and Document Image Analysis, World Scientific Publishing Company, pp. 653-677, 1997.

* cited by examiner

*Primary Examiner* — Brian P Werner
(74) *Attorney, Agent, or Firm* — Oliff PLC (57) ABSTRACT

An image processing apparatus includes an obtaining unit, a first classification unit, and a second classification unit. The obtaining unit obtains plural types of document images. The first classification unit classifies each of the plural types of document images obtained by the obtaining unit into any of classification items included in one category among plural categories, the plural categories each including plural classification items. The second classification unit classifies, in a case where there is a document image that is not classified into the one category by the first classification unit among the plural types of document images, the document image, which is not classified into the one category, into another category that includes at least one of classification items into which some of the document images are classified by the first classification unit.

15 Claims, 8 Drawing Sheets

| DOCUMENT TYPE | PATTERN 1 | | PATTERN 2 | | PATTERN 3 | | PATTERN 4 | |
|---|---|---|---|---|---|---|---|---|
| | USED? | NUMBER OF SHEETS | USED? | NUMBER OF SHEETS | USED? | NUMBER OF SHEETS | USED? | NUMBER OF SHEETS |
| TYPE 1 | YES | 1 | | | YES | 2 | | |
| TYPE 2 | YES | 1 | | | | | | |
| TYPE 3 | YES | 1 | | | YES | 1 | | |
| TYPE 4 | | | YES | 1 | | | YES | 1 |
| TYPE 5 | | | | | YES | 1 | YES | 1 |
| TYPE 6 | | | YES | 1 | | | | |
| OTHER | | | | | | | | |

FIG. 5B

| CLASSIFIED DOCUMENT | DOCUMENT TYPE |
|---|---|
| FIRST SHEET (DOCUMENT A) | TYPE 1 |
| SECOND SHEET (DOCUMENT B) | TYPE 2 |
| THIRD SHEET (DOCUMENT C) | TYPE 3 |
| FOURTH SHEET (DOCUMENT D) | TYPE 1 |
| FIFTH SHEET (DOCUMENT E) | TYPE 5 |

FIG. 6A

| DOCUMENT TYPE | PATTERN 1 | | FIRST RESULT | PATTERN 2 | | PATTERN 3 | | PATTERN 4 | | SECOND RESULT |
|---|---|---|---|---|---|---|---|---|---|---|
| | USED? | NUMBER OF SHEETS | | USED? | NUMBER OF SHEETS | USED? | NUMBER OF SHEETS | USED? | NUMBER OF SHEETS | |
| TYPE 1 | YES | 1 | FIRST SHEET (DOCUMENT A) | | | YES | 2 | | | FOURTH SHEET (DOCUMENT D) |
| TYPE 2 | YES | 1 | SECOND SHEET (DOCUMENT B) | YES | 1 | | | | | |
| TYPE 3 | YES | 1 | THIRD SHEET (DOCUMENT C) | | | YES | 1 | | | |
| TYPE 4 | | | | YES | 1 | YES | 1 | YES | 1 | |
| TYPE 5 | | | | | | | | YES | 1 | FIFTH SHEET (DOCUMENT E) |
| TYPE 6 | | | FOURTH SHEET (DOCUMENT D) | | | | | | | |
| OTHER | | | FIFTH SHEET (DOCUMENT E) | | | | | | | |

FIG. 6B

| DOCUMENT TYPE | PATTERN 1 | | PATTERN 3 | | FINAL RESULT | |
|---|---|---|---|---|---|---|
| | USED? | NUMBER OF SHEETS | USED? | NUMBER OF SHEETS | PATTERN 1 | PATTERN 3 |
| TYPE 1 | YES | 1 | YES | 2 | FIRST SHEET (DOCUMENT A) | FOURTH SHEET (DOCUMENT D) |
| TYPE 2 | YES | 1 | | | SECOND SHEET (DOCUMENT B) | |
| TYPE 3 | YES | 1 | YES | 1 | THIRD SHEET (DOCUMENT C) | |
| TYPE 4 | | | | | | |
| TYPE 5 | | | | | | FIFTH SHEET (DOCUMENT E) |
| TYPE 6 | | | | | | |
| OTHER | | | | | | |

FIG. 8

IMAGE PROCESSING APPARATUS, NON-TRANSITORY COMPUTER READABLE MEDIUM, AND IMAGE PROCESSING METHOD FOR CLASSIFYING DOCUMENT IMAGES INTO CATEGORIES

CROSS-REFERENCE TO RELATED APPLICATIONS

This application is based on and claims priority under 35 USC 119 from Japanese Patent Application No. 2015-189255 filed Sep. 28, 2015.

BACKGROUND

Technical Field

The present invention relates to an image processing apparatus, a non-transitory computer readable medium, and an image processing method.

SUMMARY

According to an aspect of the invention, there is provided an image processing apparatus including an obtaining unit, a first classification unit, and a second classification unit. The obtaining unit obtains plural types of document images. The first classification unit classifies each of the plural types of document images obtained by the obtaining unit into any of classification items included in one category among plural categories, the plural categories each including plural classification items. The second classification unit classifies, in a case where there is a document image that is not classified into the one category by the first classification unit among the plural types of document images, the document image, which is not classified into the one category, into another category that includes at least one of classification items into which some of the document images are classified by the first classification unit.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the attached drawings.

Overall Configuration of Image Processing System

Figure 1:
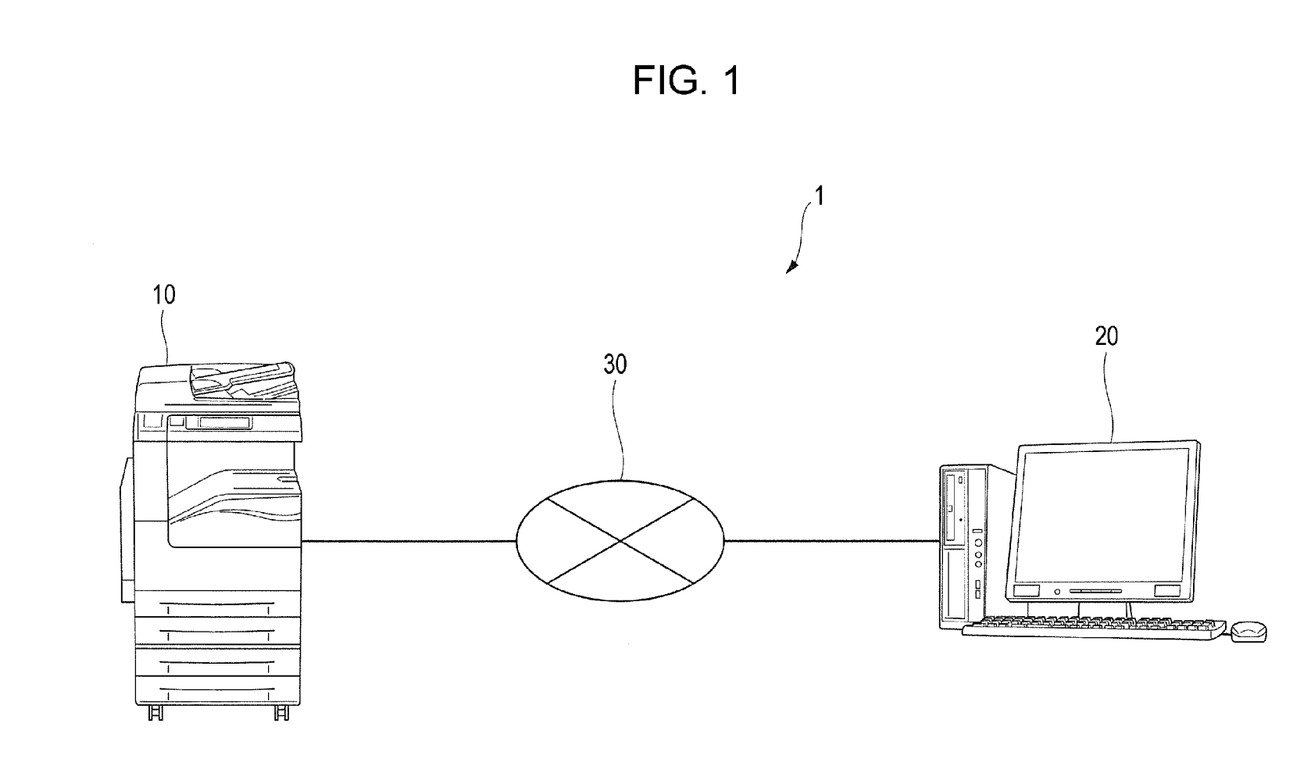
FIG. 1 is a diagram illustrating an example of an overall configuration of an image processing system according to an exemplary embodiment.

First, an overall configuration of an image processing system 1 according to this exemplary embodiment is described. FIG. 1 is a diagram illustrating an example of an overall configuration of the image processing system 1 according to this exemplary embodiment. The image processing system 1 according to this exemplary embodiment is a system for classifying documents, such as forms. Specifically, in the image processing system 1, various documents, such as "delivery slips" and "bills", are set and classified in accordance with the content of the documents. When the documents are classified into categories, a user is able to confirm the content of the documents that are classified into categories and to process the documents in accordance with a flow that is determined for each category.

As illustrated, the image processing system 1 includes an image reading apparatus 10 that reads an image formed on a document and generates image data, and a terminal apparatus 20 that receives the image data from the image reading apparatus 10 over a network 30 and performs classification.

The image reading apparatus 10 has a scan function, and therefore, reads an image formed on a document (sheet), such as a form or the like, and generates image data (hereinafter referred to as "document image") that represents the read image. Here, the image reading apparatus 10 is a scanner, for example, and employs a charge coupled device (CCD) system or a contact image sensor (CIS) system. A CCD system is a system in which light reflected from a document that is irradiated with light emitted from a light source is concentrated by a lens and is received by a CCD. A CIS system is a system in which light reflected from a document that is irradiated with sequential emission of light from a light-emitting diode (LED) light source is received by a CIS. Note that the image reading apparatus 10 may have a print function, a copy function, a facsimile function, and so on, for example, in addition to the scan function.

The terminal apparatus 20 receives a document image generated by the image reading apparatus 10 over the network 30 and classifies the received document image. As the terminal apparatus 20, a personal computer (PC) or the like may be used, for example. In this exemplary embodiment, the terminal apparatus 20 functions as an image processing apparatus, for example.

The network 30 is a communication network or the like that is used in information communication between the image reading apparatus 10 and the terminal apparatus 20, and is a local area network (LAN), for example.

In this exemplary embodiment, plural classification patterns are prepared in advance as categories into which document images are classified. The classification patterns represent document use classes. Specifically, a classification pattern is defined for each operation, such as order processing or delivery processing, for each subject, or for each customer. In each classification pattern, the types of documents used in the classification pattern are defined in advance. For example, in a case where a classification pattern is defined for an "order" operation, the types of documents used in the "order" operation are defined in advance.

Upon classification, the user specifies a classification pattern that matches the documents which have been set from among the plural classification patterns prepared in advance. When a classification pattern is specified, the terminal apparatus 20 performs a process of classifying each of the document images into any of the document types included in the specified classification pattern.

Here, almost thousands of classification patterns may be prepared in advance, for example. In such a case, it takes time for the user to specify a classification pattern. Further, the user may set plural documents that are used in different operations together at once. In this case, it further takes time for the user to specify a classification pattern for each operation. If documents used in different operations are set together and the user specifies only one classification pattern, some of the documents may be incorrectly classified into the classification pattern.

Accordingly, in this exemplary embodiment, in a case where plural documents that belong to different classification patterns are set together at once, the terminal apparatus 20 performs a process of classifying each document into a classification pattern that matches the document without the user having to select all classification patterns for the documents.

In this exemplary embodiment, a classification pattern is used as an example of a category, and a document type is used as an example of a classification item.

Hardware Configuration of Image Reading Apparatus

Figure 2:
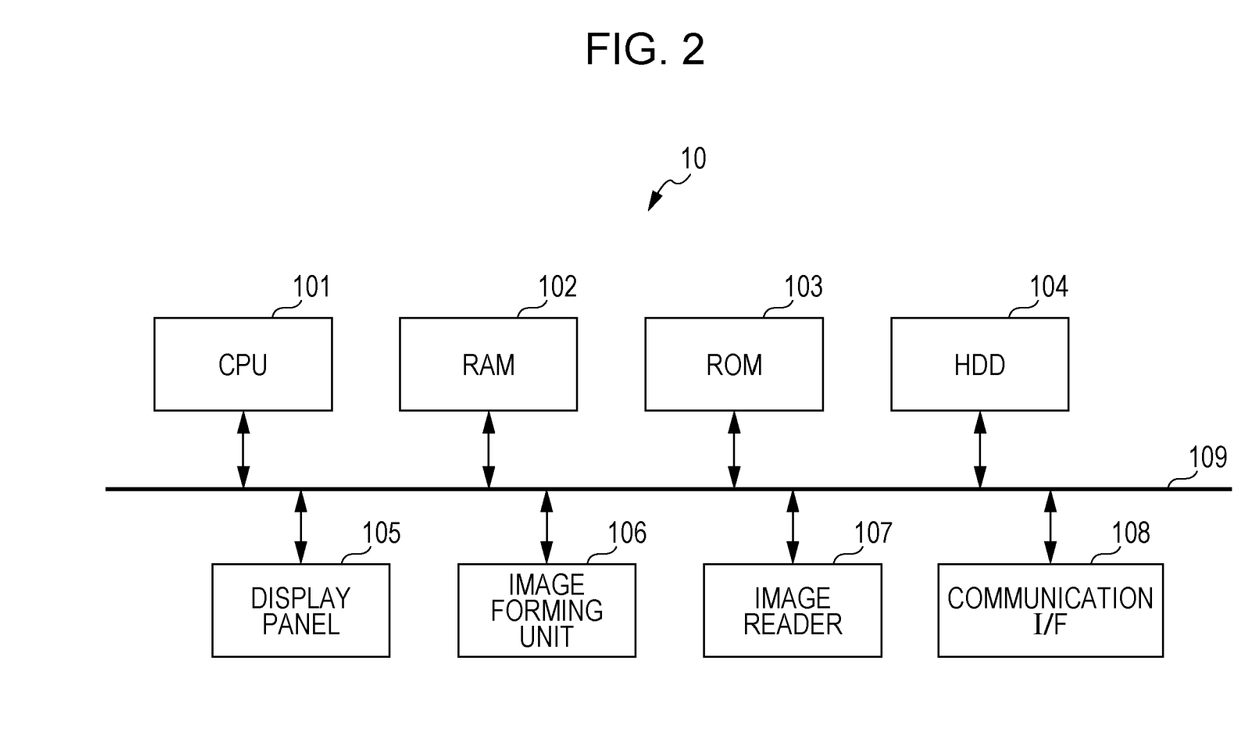
FIG. 2 is a diagram illustrating an example of a hardware configuration of an image reading apparatus according to the exemplary embodiment.

Next, a hardware configuration of the image reading apparatus 10 is described. FIG. 2 is a diagram illustrating an example of a hardware configuration of the image reading apparatus 10 according to this exemplary embodiment. As illustrated, the image reading apparatus 10 includes a central processing unit (CPU) 101, a random access memory (RAM) 102, a read-only memory (ROM) 103, a hard disk drive (HDD) 104, a display panel 105, an image forming unit 106, an image reader 107, and a communication interface (hereinafter referred to as "communication I/F") 108. These functional units are connected to a bus 109 and exchange data via the bus 109.

The CPU 101 executes various programs, such as an operating system (OS), an application, and so on. The RAM 102 is a memory that is used as a work memory or the like of the CPU 101. The ROM 103 is a memory that stores various programs executed by the CPU 101. The CPU 101 loads various programs stored in the ROM 103 or the like to the RAM 102 and executes the programs to thereby implement functions of the image reading apparatus 10. The HDD 104 provides a storage area in which data input into various types of software, data output from various types of software, and so on are stored.

The display panel 105 displays various types of information and accepts input of user operations.

The image forming unit 106 forms an image on a recording medium on the basis of input image data. Here, the image forming unit 106 is a printer, for example, and employs an electrophotographic system in which toner applied to a photoreceptor is transferred to a recording medium to form an image, an ink-jet system in which ink is jetted on a recording medium to form an image, or the like.

The image reader 107 is a scanner, for example, and therefore, reads an image formed on a document and generates a document image that represents the read image.

The communication I/F 108 functions as an interface for transmitting/receiving various types of data to/from an external apparatus, such as the terminal apparatus 20, over the network 30.

Hardware Configuration of Terminal Apparatus

Figure 3:
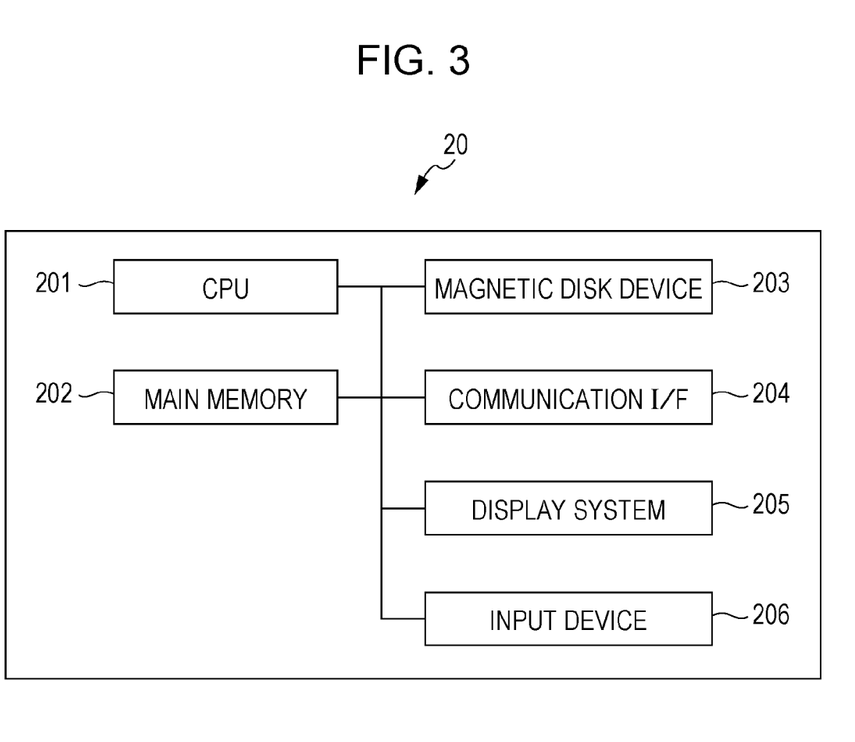
FIG. 3 is a diagram illustrating an example of a hardware configuration of a terminal apparatus according to the exemplary embodiment.

Next, a hardware configuration of the terminal apparatus 20 is described. FIG. 3 is a diagram illustrating an example of a hardware configuration of the terminal apparatus 20 according to this exemplary embodiment. As illustrated, the terminal apparatus 20 includes a CPU 201, which is an arithmetic unit, a main memory 202, which is a storage unit, and a magnetic disk device (HDD) 203.

Here, the CPU 201 executes various programs, such as an OS, an application, and so on, to thereby implement functions of the terminal apparatus 20. The main memory 202 provides a storage area in which various programs and data or the like used when the programs are executed are stored. The magnetic disk device 203 provides a storage area in which data input into various programs, data output from various programs, and so on are stored. The terminal apparatus 20 further includes a communication I/F 204 for external communication, a display system 205 constituted by a video memory, a display, and so on, and an input device 206, such as a keyboard, a mouse, or the like.

Functional Configuration of Terminal Apparatus

Figure 4:
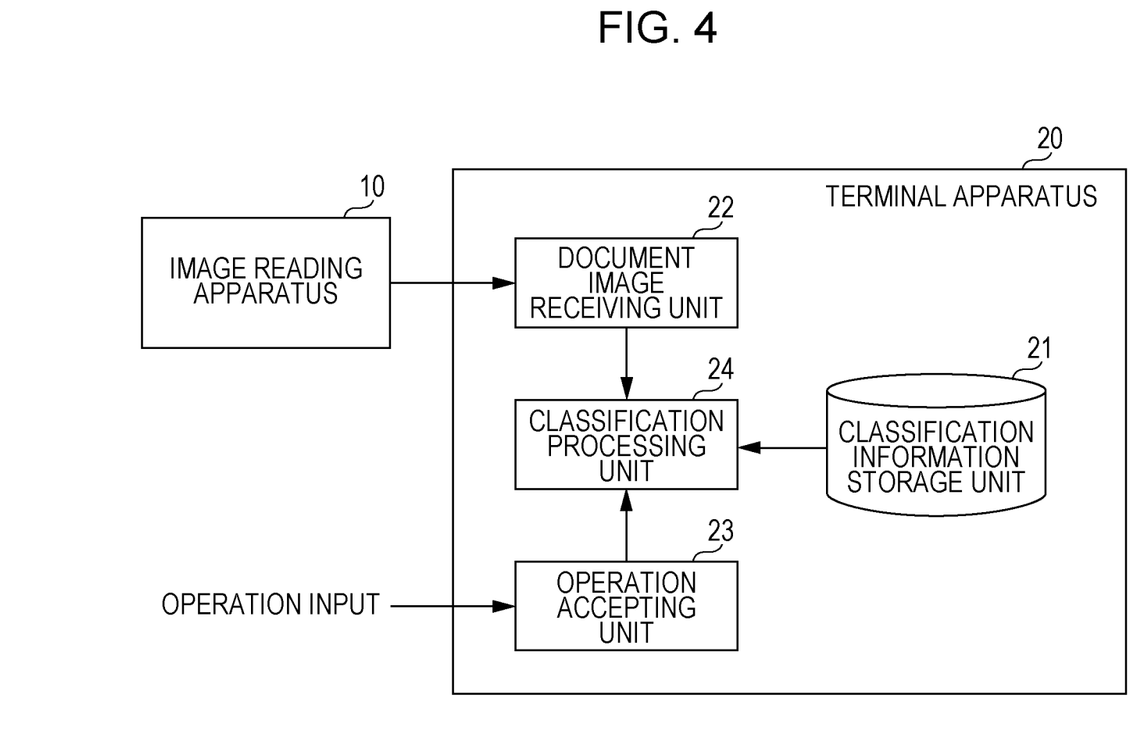
FIG. 4 is a block diagram illustrating an example of a functional configuration of the terminal apparatus according to the exemplary embodiment.

Next, a functional configuration of the terminal apparatus 20 is described. FIG. 4 is a block diagram illustrating an example of a functional configuration of the terminal apparatus 20 according to this exemplary embodiment. The terminal apparatus 20 includes a classification information storage unit 21 that stores information used to classify document images, a document image receiving unit 22 that receives document images from the image reading apparatus 10 over the network 30, an operation accepting unit 23 that accepts input of user operations, and a classification processing unit 24 that classifies the received document images.

The classification information storage unit 21 stores information used to classify document images. Specifically, the classification information storage unit 21 stores plural classification patterns prepared in advance and document types used in each classification pattern.

The classification information storage unit 21 also stores, for each document type, information for identifying the document type. Here, in a case of classifying a document image, characters included in the document image are recognized by performing optical character recognition (OCR), for example. OCR is a technique for analyzing characters on an image and converting the characters into character data that is processed by a computer. Accordingly, the classification information storage unit 21 stores, for each document type, a character string or the like for identifying the document type.

The document image receiving unit 22 receives from the image reading apparatus 10 over the network 30 document images generated by the image reader 107 reading images formed on documents.

The operation accepting unit 23 accepts input of user operations. For example, the operation accepting unit 23 accepts a user operation of specifying a classification pattern upon classification of document images.

The classification processing unit 24 classifies plural types of document images received by the document image receiving unit 22. Specifically, the classification processing unit 24 classifies, in accordance with a classification pattern specified by the user, each document image into any of the document types included in the specified classification pattern. In a case where there is a document image that does not match any of the types included in the specified classification pattern, the document image is not classified into the specified classification pattern. In this case, the classification processing unit 24 classifies the document image that has not been classified into the specified classification pattern into an "other" item, for example. The classification processing unit 24 thereafter performs a process of classifying, in accordance with a classification pattern other than the specified classification pattern, the document image classified into the "other" item.

When classifying a document image, the classification processing unit 24 recognizes characters included in the document image by performing OCR as described above, for example. Specifically, the classification processing unit 24 identifies a document type corresponding to the document image by checking the character string on the document image recognized by performing OCR against character strings stored in the classification information storage unit 21 for the respective document types and classifies the document image into the classification pattern.

These functional units included in the terminal apparatus 20 are implemented by software and hardware resources working together. Specifically, the CPU 201 loads a program for implementing the functional units of the terminal apparatus 20 from the magnetic disk device 203 to the main memory 202, for example, and executes the program to thereby implement the functional units. The classification information storage unit 21 is implemented by using the magnetic disk device 203, for example.

In this exemplary embodiment, the document image receiving unit 22 functions as an obtaining unit, for example, and the classification processing unit 24 functions as a first classification unit and a second classification unit, for example.

Description of Process of Classifying Document Images

Next, a process in which the classification processing unit 24 classifies document images is described with reference to FIGS. 5A to 6B. FIGS. 5A to 6B are diagrams for describing an example of the process in which the classification processing unit 24 classifies document images.

Figure 5A:
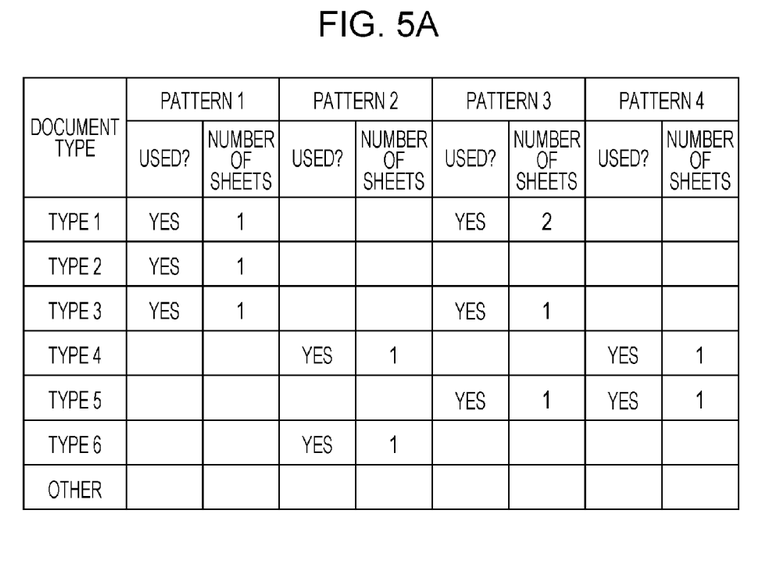
FIGS. 5A and 5B are diagrams for describing an example of a process in which a classification processing unit classifies document images.

FIG. 5A is a diagram illustrating an example of document types defined for each classification pattern. In the example illustrated in FIG. 5A, pattern 1 to pattern 4 are defined as classification patterns, and type 1 to type 6 are defined as document types. For each classification pattern, the "used?" column marked with "yes" indicates that the corresponding document type is used in the classification pattern. The "number of sheets" column is used to indicate, for each document type, a number of sheets that is specified as the number of document sheets used in each classification pattern (hereinafter referred to as "specified number of sheets").

For example, in pattern 1, one type-1 document sheet, one type-2 document sheet, and one type-3 document sheet are used. For example, in pattern 3, one type-3 document sheet and one type-5 document sheet are used while two type-1 document sheets are used. That is, in order to perform a pattern-3 operation, only one type-3 document sheet and one type-5 document sheet are necessary while two type-1 document sheets are necessary.

Figure 5B:
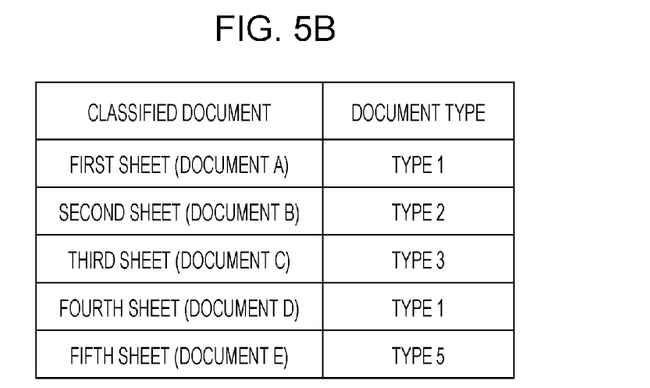

FIG. 5B is a diagram for describing an example of documents that are actually set on the image reading apparatus 10 and classified. Here, it is assumed that document A to document E, five sheets in total, are set on the image reading apparatus 10 in order. That is, document A is set as a first sheet, and subsequently, document B, document C, document D, and document E are set as second to fifth sheets respectively. It is further assumed that document A is a type-1 document, document B is a type-2 document, document C is a type-3 document, document D is a type-1 document, and document E is a type-5 document.

Figure 6A:
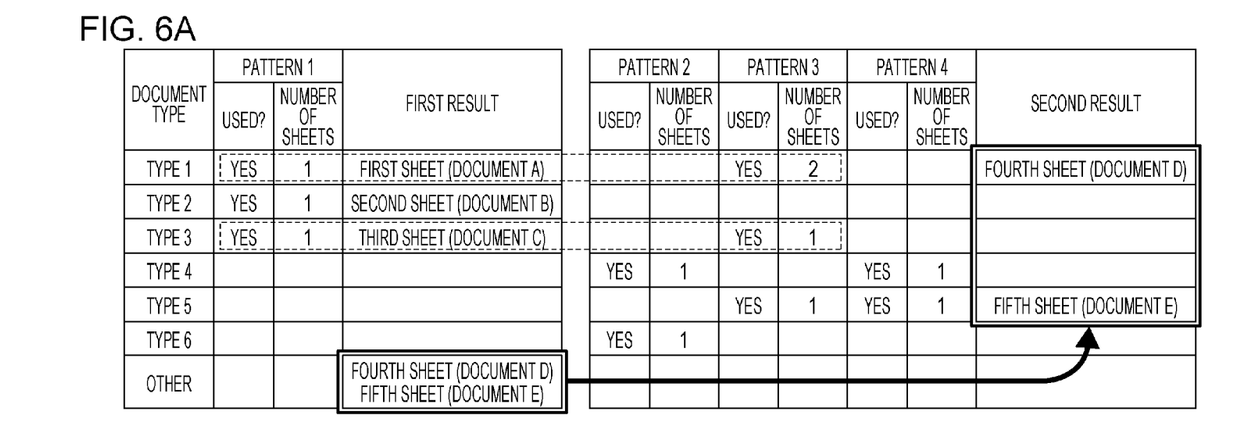
FIGS. 6A and 6B are diagrams for describing an example of the process in which the classification processing unit classifies document images.
Figure 6B:
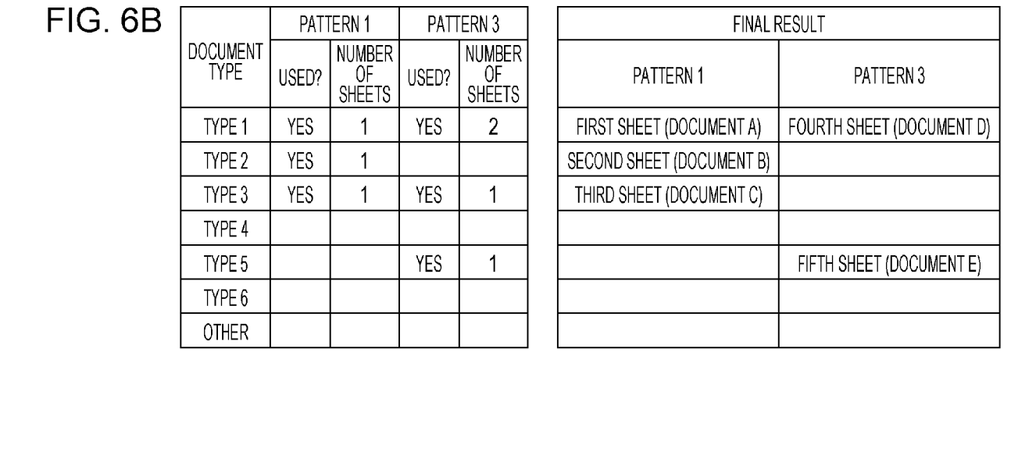

FIGS. 6A and 6B are diagrams for describing an example of a result of classifying document A to document E illustrated in FIG. 5B in accordance with the classification patterns illustrated in FIG. 5A.

First, it is assumed that the user specifies "pattern 1" illustrated in FIG. 5A as a classification pattern. When "pattern 1" is specified, the classification processing unit 24 classifies each document image into any of the document types included in the specified "pattern 1". Specifically, the classification processing unit 24 performs character recognition on document A, which is the first sheet, and on the subsequent documents in order and determines whether each document corresponds to any of type 1 to type 3 on the basis of the recognized characters.

Here, document A, which is the first sheet, is identified as type-1 on the basis of the recognized characters and classified as type 1. Subsequently, document B, which is the second sheet, is classified as type 2, document C, which is the third sheet, is classified as type 3, and document D, which is the fourth sheet, is classified as type 1. However, document E, which is the fifth sheet, does not correspond to any of type 1 to type 3, and therefore, is classified as "other".

As a result, document A and document D, two sheets in total, are classified as type 1, document B is classified as type 2, and document C is classified as type 3. In "pattern 1", one type-1 document sheet, one type-2 document sheet, and one type-3 document sheet are used, as illustrated in FIG. 5A. However, the number of document sheets classified as type 1 is two and exceeds the specified number of sheets. In this case, the classification processing unit 24 selects a document image for the specified number of sheets in accordance with a predetermined rule.

For example, the classification processing unit 24 determines the degree of similarity between a character string for classification as "type 1" stored in the classification information storage unit 21 and a character string included in a document image. The classification processing unit 24 preferentially selects a document image having a higher degree of similarity. Here, a character string for classification as "type 1" is used as a predetermined character string, for example.

More specifically, in a case where document A includes a character string that exactly matches the character string for classification as "type 1" while document D includes a regular expression that is obtained by replacing one character in the character string for classification as "type 1" with a different character, document A that includes the exactly matching character string is given priority. That is, document A is classified into pattern 1 while document D is classified as "other".

The degree of similarity is not necessarily determined by using an exactly matching character string or a regular expression and may be determined in accordance with the accuracy of character recognition based on OCR. In general, in OCR, the accuracy is determined for each character on which character recognition is performed. More specifically, the accuracy determined for the same character may vary depending on the size and typeface of the character. As the accuracy increases, it is determined that the character recognition is highly reliable. Accordingly, a document image for which OCR has been performed with high accuracy may be preferentially selected.

In this way, document A is classified as type 1, document B is classified as type 2, and document C is classified as type 3 as a result of the first classification, as illustrated in FIG. 6A. Document D and document E are classified as "other".

Next, the classification processing unit 24 searches for another classification pattern on the basis of the result of first classification and classifies the document images classified as "other".

Here, the classification processing unit 24 searches for another classification pattern that includes at least one of the document types (type 1 to type 3 in the example illustrated in FIG. 6A) into which document images are classified in the first classification.

In the example illustrated in FIG. 6A, although pattern 2 and pattern 4 do not include type 1 to type 3, pattern 3 includes type 1 and type 3. Therefore, the classification processing unit 24 selects "pattern 3" as a result of the search. The classification processing unit 24 thereafter classifies document D and document E that are classified as "other" in the first classification into any of the document types included in "pattern 3". As a result, document D, which is the fourth sheet, is classified as type 1 and document E, which is the fifth sheet, is classified as type 5, as illustrated in FIG. 6A. Consequently, the second classification is completed.

FIG. 6B illustrates a final classification result. As illustrated, document A to document C are sorted into pattern 1, and document D and document E are sorted into pattern 3. Further, document A and document D are classified as type 1, document B is classified as type 2, document C is classified as type 3, and document E is classified as type 5.

In the result illustrated in FIG. 6B, all documents used in pattern 1 are obtained. However, regarding documents used in pattern 3, one type-1 document sheet and one type-3 document sheet are not obtained. In other words, if document A and document C are classified into pattern 3 instead of pattern 1, all documents used in pattern 3 are obtained. As described above, the example illustrated in FIGS. 5A to 6B illustrates the case where plural documents that belong to different classification patterns, namely, pattern 1 and pattern 3, are set and where the plural documents include documents that may be classified into any of the classification patterns.

In the case where the user sets plural documents all together as in the example illustrated in FIGS. 5A to 6B, the plural documents may include documents that may be classified into any of the different classification patterns. In this exemplary embodiment, as described above, the classification processing unit 24 performs classification in accordance with the classification pattern specified by the user as the first classification, and thereafter, selects another classification pattern on the basis of the result of first classification. Here, the classification processing unit 24 selects another classification pattern that includes at least one of the document types into which document images are classified in the first classification. The classification processing unit 24 thereafter classifies documents classified as "other" in the first classification in accordance with the selected other classification pattern as the second classification.

Procedure of Process of Classifying Document Images

Figure 7:
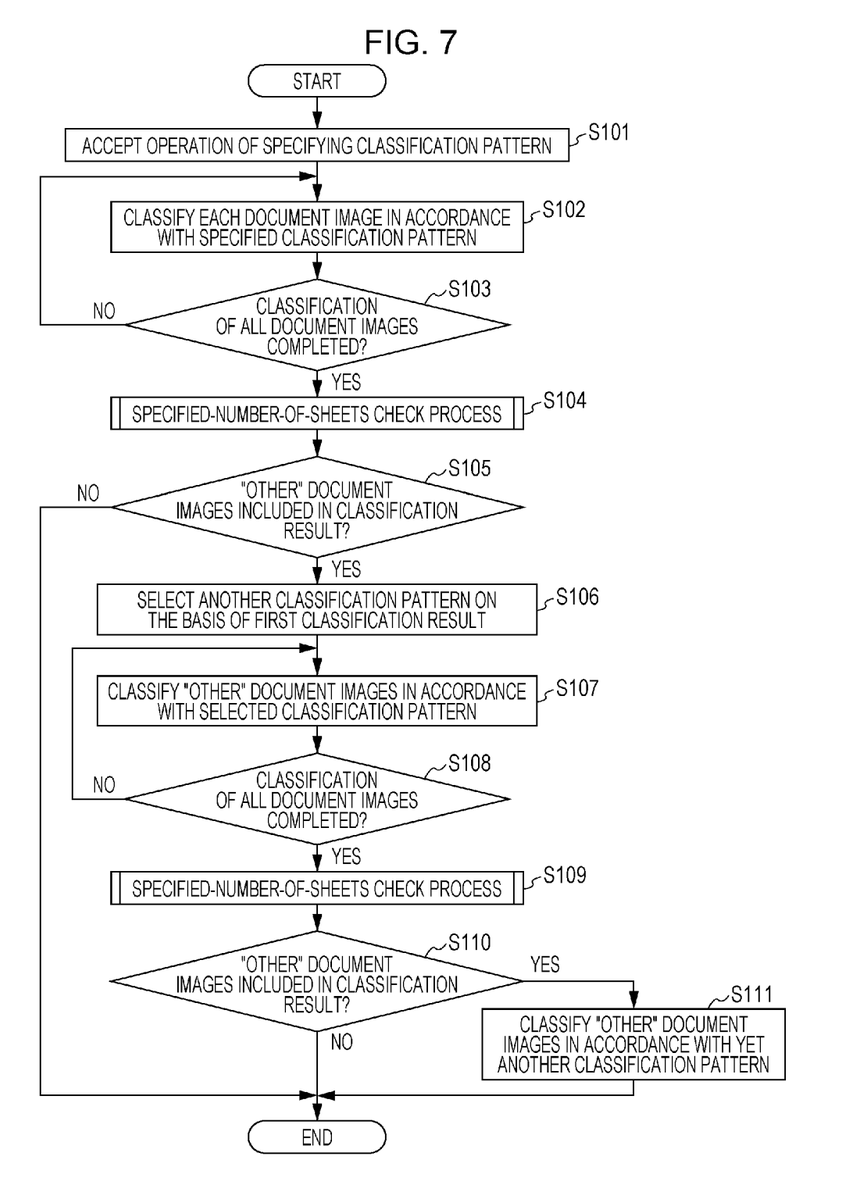
FIG. 7 is a flowchart illustrating an example of the process in which the classification processing unit classifies document images.

Next, a procedure of the process in which the classification processing unit 24 classifies document images is described. FIG. 7 is a flowchart illustrating an example of a procedure of the process in which the classification processing unit 24 classifies document images. It is assumed that the user has set plural documents on the image reading apparatus 10 in the initial state.

First, the user performs an operation of specifying one classification pattern in accordance with the set documents. The operation accepting unit 23 accepts the operation of specifying one classification pattern (step S101). Next, when the user operates the image reading apparatus 10, the set documents are read, and generated document images are transmitted to the terminal apparatus 20.

Next, the classification processing unit 24 classifies each document image in accordance with the specified classification pattern (step S102). Here, the classification processing unit 24 performs character recognition on each document image and classifies the document image into any of the document types included in the specified classification pattern. A document image that does not correspond to any of the document types included in the specified classification pattern is classified as "other".

Next, the classification processing unit 24 determines whether classification of all document images is completed (step S103). If it is determined that there is a document image that is not yet classified (No in step S103), the flow returns to step S102. If it is determined that classification of all document images is completed (Yes in step S103), the classification processing unit 24 performs a specified-number-of-sheets check process (step S104). In the specified-number-of-sheets check process, it is checked if there is a document type into which document images for a number of sheets larger than the number of sheets specified for the classification pattern are classified. Any of such document images is classified as "other". The procedure of the specified-number-of-sheets check process is described in detail below.

Next, the classification processing unit 24 determines whether document images that are classified as "other" are included in the result of classification (step S105). If it is determined that document images that are classified as "other" are not included (No in step S105), the process flow ends. On the other hand, if it is determined that document images that are classified as "other" are included (Yes in step S105), the classification processing unit 24 selects another classification pattern on the basis of the result of first classification (step S106). Here, the classification processing unit 24 selects another classification pattern that includes at least one of the document types into which document images are classified in the first classification.

Next, the classification processing unit 24 classifies the document images that are classified as "other" in the first classification in accordance with the selected classification pattern (step S107). Subsequently, the classification processing unit 24 determines whether classification of all document images classified as "other" in the first classification is completed (step S108). If it is determined that there is a document image that is not yet classified (No in step S108), the flow returns to step S107. On the other hand, if it is determined that classification of all document images is completed (Yes in step S108), the classification processing unit 24 performs the specified-number-of-sheets check process as in step S104 (step S109).

Next, the classification processing unit 24 determines whether document images that are classified as "other" are included in the result of classification (step S110). If it is determined that document images that are classified as "other" are not included (No in step S110), the process flow ends. On the other hand, if it is determined that document images that are classified as "other" are included (Yes in step S110), the classification processing unit 24 selects yet another classification pattern and classifies the document images classified as "other" (step S111). Thereafter, the process flow ends.

Note that, in step S106, there may be a case where plural other classification patterns include at least one of the document types into which document images are classified in the first classification. In this case, the classification processing unit 24 selects another classification pattern in accordance with a predetermined rule.

For example, the classification processing unit 24 selects, from among plural classification patterns that are prepared in advance and that are respectively assigned numbers in advance, a classification pattern assigned the smallest number. Alternatively, the classification processing unit 24 may preferentially select a classification pattern that includes a larger number of document types among the document types into which document images are classified in the first classification. For example, if the document images are classified into three document types in the first classification, the classification processing unit 24 preferentially selects a classification pattern that includes all of the three document types. If there are plural classification patterns each including all of the three document types, the classification processing unit 24 selects a classification pattern that is assigned in advance the smallest number from among the plural classification patterns.

Note that, in step S106, the classification processing unit 24 selects another classification pattern that includes at least one of the document types into which document images are classified in the first classification; however, all document images may be classified as "other" in the first classification. In this case, the classification processing unit 24 first identifies the document types of all of the document images by referring to information stored in the classification information storage unit 21. The classification processing unit 24 thereafter selects a classification pattern that includes the largest number of document types among the identified document types from among the plural classification patterns prepared in advance, and performs second classification.

Note that, also in step 111, there may be a case where plural remaining classification patterns are present. In this case, the classification processing unit 24 selects yet another classification pattern in accordance with a predetermined rule as in step S106 described above.

For example, the classification processing unit 24 preferentially selects a classification pattern that includes document types into which document images are classified in the first classification from among the remaining classification patterns. If there is no classification pattern that includes document types into which document images are classified in the first classification, the classification processing unit 24 selects a classification pattern that is assigned in advance the smallest number.

In this way, the process is performed in step S111 in which classification patterns are selected one by one until all document images are respectively classified into corresponding document types of any of the classification patterns.

Procedure of Specified-Number-of-Sheets Check Process

Figure 8:
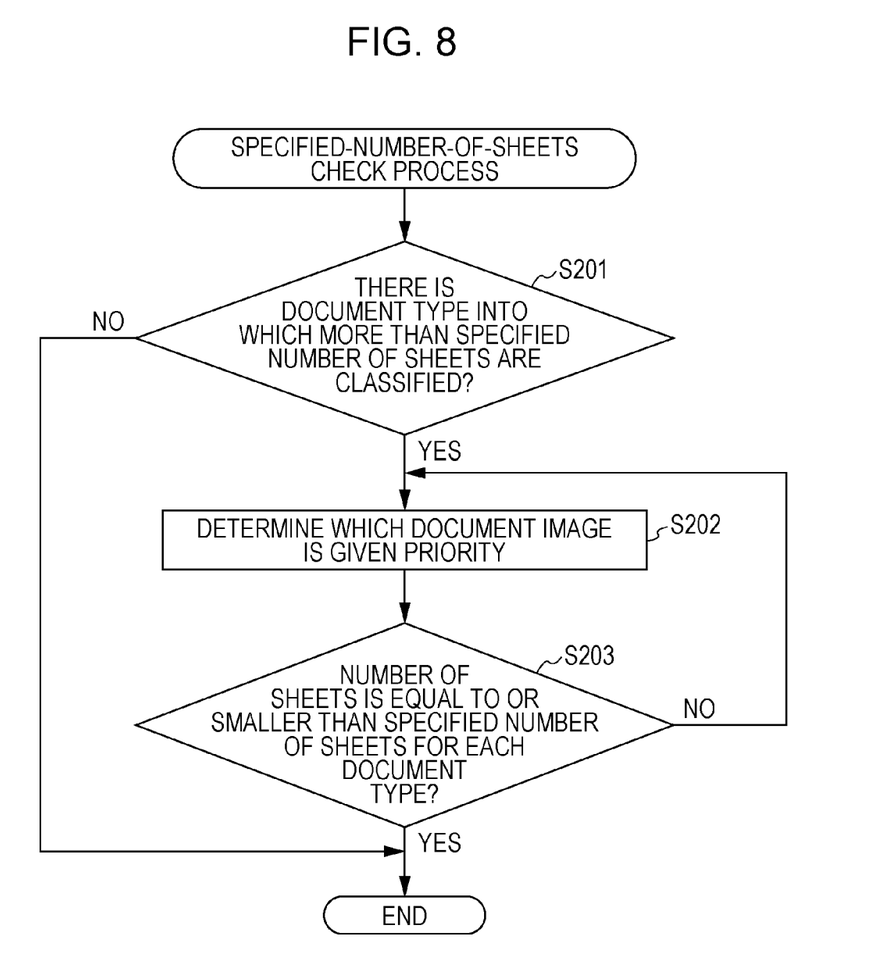
FIG. 8 is a flowchart illustrating an example of a specified-number-of-sheets check process.

Next, a procedure of the specified-number-of-sheets check process performed in steps S104 and S109 in the procedure illustrated in FIG. 7 is described. FIG. 8 is a flowchart illustrating an example of a procedure of the specified-number-of-sheets check process.

First, the classification processing unit 24 checks if there is a document type into which document images for a number of sheets larger than the number of sheets specified for the classification pattern are classified (step S201). If the result of determination in step S201 is negative (No in step S201), the process flow ends. On the other hand, if the result of determination in step S201 is positive (Yes in step S201), the classification processing unit 24 determines which document image among the document images is given priority for the document type into which more than the specified number of sheets are classified (step S202). Here, as described above, the classification processing unit 24 gives priority to a document image that includes a character string highly similar to a character string stored in the classification information storage unit 21, for example. A document image that is not given priority is classified as "other".

Next, the classification processing unit 24 determines whether the number of sheets is equal to or smaller than the specified number of sheets for each document type defined in the classification pattern (step S203). If the result of determination in step S203 is negative (No in step S203), the flow returns to step S202. On the other hand, if the result of determination in step S203 is positive (Yes in step S203), the process flow ends.

Note that, in step S202, a document image to be given priority is selected on the basis of the degree of similarity with a character string stored in the classification information storage unit 21; however selection of a document image to be given priority is not limited to this. For example, a document image to be given priority may be selected in accordance with an order in which documents have been set and an order in which the document images have been received by the document image receiving unit 22 (that is, an order in which documents have been scanned by the image reading apparatus 10). For example, a case is assumed where it is specified that one type-1 document sheet is used in a classification pattern specified by a user, and document A, which is the first sheet, and document B, which is the second sheet, are classified as type 1 as a result of classification. In this case, document A, which is the first sheet and which has been set earlier, is given priority and classified as type 1 in the classification pattern. On the other hand, document B, which is the second sheet, is classified as "other".

Alternatively, a document image to be given priority may be selected in accordance with a user operation. For example, a case is assumed where it is specified that one type-1 document sheet is used in a classification pattern specified by a user, and document A, which is the first sheet, and document B, which is the second sheet, are classified as type 1 as a result of classification. In this case, the image of document A and the image of document B are displayed on the display system 205 or the like, and the user is prompted to select either document A or document B that is to be given priority.

As described above, the terminal apparatus 20 according to this exemplary embodiment performs classification in accordance with a classification pattern specified by a user as the first classification, and thereafter, selects another classification pattern on the basis of the result of first classification. Here, the terminal apparatus 20 selects another classification pattern that is used in the second classification from among classification patterns that include at least one of the document types into which document images are classified in the first classification. The terminal apparatus 20 thereafter classifies documents that are classified as "other" in the first classification in accordance with the specified other classification pattern as the second classification. Accordingly, in the second classification, the terminal apparatus 20 selects a classification pattern and performs classification without the user having to specify a classification pattern.

In this exemplary embodiment, the user specifies a classification pattern before the image reading apparatus 10 reads images; however, the user may specify a classification pattern after the image reading apparatus 10 has read images. In this exemplary embodiment, the user performs an operation of specifying a classification pattern at the terminal apparatus 20; however, the user may perform the operation at the image reading apparatus 10.

In this exemplary embodiment, the terminal apparatus 20 may also select a classification pattern used in the first classification in accordance with a predetermined rule instead of the user. In this case, the terminal apparatus 20 first identifies the document types of all received document images by referring to information stored in the classification information storage unit 21. The terminal apparatus 20 thereafter selects, from among all classification patterns prepared in advance, a classification pattern that includes the largest number of document types among the identified document types, for example. Here, in a case where plural candidate classification patterns are present, the terminal apparatus 20 gives priority to a classification pattern assigned the smallest number among the classification patterns, which are respectively assigned numbers in advance. Alternatively, the user may perform an operation of specifying a classification pattern at the terminal apparatus 20 or the image reading apparatus 10 instead of the terminal apparatus 20 selecting a classification pattern.

In this exemplary embodiment, the image reading apparatus 10 may have the functions of the terminal apparatus 20. In this case, the image reading apparatus 10 reads images formed on documents and generates document images. The image reading apparatus 10 thereafter sorts the generated document images into any of the classification patterns and classifies the document images into document types. In this case, the image reading apparatus 10 may be regarded as an example of the image processing apparatus.

A program for implementing the exemplary embodiment of the present invention may be provided over a communication network or the like as a matter of course or may be stored in a recording medium, such as a compact disc read-only memory (CD-ROM) and provided therefrom.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a central processing unit (CPU) configured to act as:
an obtaining unit that obtains a plurality of types of document images;
a first classification unit that classifies each of the plurality of types of document images obtained by the obtaining unit into any of classification items included in one category among a plurality of categories, the plurality of categories each including a plurality of classification items; and
a second classification unit that classifies, when there is a document image that is not classified into the one category by the first classification unit among the plurality of types of document images, the document image, which is not classified into the one category, into another category that includes at least one of classification items into which some of the document images are classified by the first classification unit; and
a display panel that displays information regarding the classification of the plurality of types of document images, wherein
when the one category is specified by a user, the first classification unit classifies each of the plurality of types of document images into the one category that is specified,
when the one category is not specified by the user and is selected in accordance with a predetermined rule, the first classification unit classifies each of the plurality of types of document images into the one category that is selected, and
when the plurality of types of document images are classified and the display panel displays information regarding the classification of the plurality of types of images on the display, the user is able to confirm the content of the plurality of types of document images that are classified and to process the plurality of types of images in accordance with a process that is determined for the specified or selected category.

2. The image processing apparatus according to claim 1, wherein
for each of the categories, the number of document images to be classified into each classification item is specified in advance, and
when there is a classification item into which more than the specified number of document images are classified as a result of classifying each of the plurality of types of document images into any of the classification items included in the one category, the first classification unit selects and classifies the specified number of document images into the classification item in accordance with a predetermined rule.

3. The image processing apparatus according to claim 2, wherein
the first classification unit selects the specified number of document images in accordance with whether a character string included in a document image is similar to a predetermined character string as the predetermined rule.

4. The image processing apparatus according to claim 2, wherein
the first classification unit selects the specified number of document images in order from a document image that has been obtained earlier as the predetermined rule.

5. The image processing apparatus according to claim 2, wherein
the first classification unit selects the specified number of document images in accordance with a user operation as the predetermined rule.

6. The image processing apparatus according to claim 1, wherein
when there is a document image that is not classified into the other category, the second classification unit classifies the document image, which is not classified into the other category, into a different category that does not include the classification items into which some of the document images are classified by the first classification unit.

7. The image processing apparatus according to claim 1, wherein the classification items correspond to document types, and the categories correspond to operations in which a plurality of types of documents are used.

8. A non-transitory computer readable medium storing a program causing a computer to execute a process for image processing, the process comprising:
performing, an obtaining function of obtaining a plurality of types of document images;
performing a first classification function of classifying each of the plurality of types of document images that are obtained into any of classification items included in one category among a plurality of categories, the plurality of categories each including a plurality of classification items;
performing a second classification function of classifying, when there is a document image that is not classified into the one category among the plurality of types of document images, the document image, which is not classified into the one category, into another category that includes at least one of classification items into which some of the document images are classified,
wherein the obtaining function, the first classification function and the second classification function are performed by the computer; and
displaying, by a display panel, information regarding the classification of the plurality of types of document images, wherein
when the one category is specified by a user, performing the first classification function includes classifying each of the plurality of types of document images into the one category that is specified,
when the one category is not specified by a user and is selected in accordance with a predetermined rule, classifying each of the plurality of types of document images into the one category that is selected, and
when the plurality of types of document images are classified and the display panel displays information regarding the classification of the plurality of types of images on the display, the user is able to confirm the content of the plurality of types of document images that are classified and to process the plurality of types of images in accordance with a process that is determined for the specified or selected category.

9. The non-transitory computer readable medium according to claim 8, wherein
for each of the categories, the number of document images to be classified into each classification item is specified in advance, and
when there is a classification item into which more than the specified number of document images are classified as a result of classifying each of the plurality of types of document images into any of the classification items included in the one category, the performing of the first classification function includes selecting and classifying the specified number of document images into the classification item in accordance with a predetermined rule.

10. The non-transitory computer readable medium according to claim 9, wherein
performing the first classification function includes selecting the specified number of document images in accordance with whether a character string included in a document image is similar to a predetermined character string as the predetermined rule.

11. The non-transitory computer readable medium according to claim 9, wherein
performing the first classification function includes selecting the specified number of document images in order from a document image that has been obtained earlier as the predetermined rule.

12. The non-transitory computer readable medium according to claim 9, wherein
performing the first classification function includes selecting the specified number of document images in accordance with a user operation as the predetermined rule.

13. The non-transitory computer readable medium according to claim 8, wherein
when there is a document image that is not classified into the other category, performing the second classification function includes classifying the document image, which is not classified into the other category, into a different category that does not include the classification items into which some of the document images are classified in performing the first classification function.

14. The non-transitory computer readable medium according to claim 8, wherein
the classification items correspond to document types, and the categories correspond to operations in which a plurality of types of documents are used.

15. An image processing method comprising:
performing an obtaining function of obtaining a plurality of types of document images;
performing a first classification function of classifying each of the plurality of types of document images that are obtained into any of classification items included in one category among a plurality of categories, the plurality of categories each including a plurality of classification items;
performing a second classification function of classifying, when there is a document image that is not classified into the one category among the plurality of types of document images, the document image, which is not classified into the one category, into another category that includes at least one of classification items into which some of the document images are classified,
wherein the obtaining function, the first classification function and the second classification function are performed by the computer; and
displaying, by a display panel, information regarding the classification of the plurality of types of document images, wherein
when the one category is specified by a user, performing the first classification function includes classifying each of the plurality of types of document images into the one category that is specified,
when the one category is not specified by a user and is selected in accordance with a predetermined rule, classifying each of the plurality of types of document images into the one category that is selected, and
when the plurality of types of document images are classified and the display panel displays information regarding the classification of the plurality of types of images on the display, the user is able to confirm the content of the plurality of types of document images that are classified and to process the plurality of types of images in accordance with a process that is determined for the specified or selected category.

* * * * *